Patented Nov. 6, 1951

2,573,796

UNITED STATES PATENT OFFICE 2,573,796

PRODUCTION OF CALCIUM SULFONATE SOLUTIONS

Harold E. Latler, Sinclair, Wyo., and Franklin M. Watkins, Flossmoor, Ill., assignors to Sinclair Refining Company, New York, N. Y., a corporation of Maine No Drawing. Application July 27, 1948,
Serial No. 40,982

6 Claims. (Cl. 260—504)

This invention relates to improvements in the production of calcium sulfonates in petroleum oils by line neutralization of sulfuric acid-treated petroleum oils, and provides a practical and economical process for concentrating the calcium sulfonates in the oils. By means of the process, concentrates containing up to 50% calcium sulfonates may be readily produced from sulfuric acid-treated oils containing as little as 5–10% sulfonic acids.

It is conventional to treat sludge-free sulfuric acid-treated oils with slaked lime $(Ca(OH)_2)$ and water to neutralize the sulfonic acids in the oil. Following such treatment, it is normal practice to heat the oil to a temperature of about 280° F. in order to dehydrate it, whereafter the oil is freed of suspended material by filtration ordinarily carried out with the assistance of a filter aid. The filtered oil may have, for example, a calcium content of from .4% to .5%, the calcium being present in the form of neutral calcium sulfonates.

Calcium sulfonates are particularly valuable for use as addends for lubricating oils in which they act as corrosion inhibitors and exert other desirable effects. Although it is convenient to add them to lubricating oils in oil solution, the above solution containing from .4% to .5% calcium is of limited application in this connection because of its low concentration of sulfonates. Efforts to concentrate the highly oil soluble neutral sulfonates in this solution by measures such as settling, centrifugation, etc. have met with little success.

We have now unexpectedly discovered that the sulfonates as they exist in the oil prior to heating of the oil to dehydration temperatures are amenable to concentration by either settling or centrifugation. For we have found that a calcium sulfonate concentrate forms within the oil when about one to two per cent of water by weight of the acid oil is used during neutralization of acid oil with excess calcium hydroxide. The amount of excess lime used does not appear to affect the formation of the concentrate layer. Upon settling a concentrate layer containing the bulk of the sulfonates and roughly 40% to 60% of the oil separates and may be visually observed below a supernatant layer of light clear oil. The two-phase oil system reverts to the single oil layer of conventional practice upon heating or dehydration, but prior to dehydration the concentrate can be mechanically or gravitationally separated as by cold settling and decanting or by centrifuging, for example.

We believe that the ratio of calcium sulfonate to water may control formation of a concentrate, possibly through hydrate formation. In view of our discovery, it seems to us clear that the sulfonates at this stage are in the form of complexes which are relatively insoluble in oil. Thus there may be present in the oil, (1) a hydrated hydroxy calcium sulfonate,

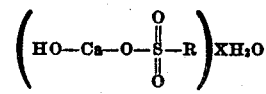

(2) a basic calcium sulfonate,

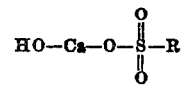

(3) a calcium sulfonate hydrate,

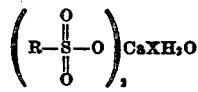

(4) a mixed salt,

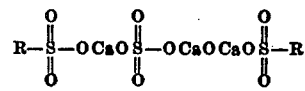

R in these formulae represents a hydrocarbon radical such as an alkyl, alkylene or aryl radical. On this basis it appears that the critical ratio of sulfonate to water lies in the range of one molecule of calcium sulfonate to about 6 minimum, to 12 maximum molecules of water.

Although we have carried out a number of experiments which substantiate that complexes of the above character are formed as a result of treatment of acid oil with calcium hydroxide but are destroyed upon subsequent heating of the oil to dehydration temperatures, it is to be understood that our invention is not predicated on the accuracy of any theories advanced herein.

In accordance with the present invention, acid oil is agitated with calcium hydroxide and from one to two per cent of water by weight on the acid oil for a period sufficiently long to effect complete neutralization of the oil. The mixture is then allowed to stand without agitation until separation into three layers occurs. The upper of the three layers consists of clear oil containing only very small amounts of sulfonates most of which are concentrated in the middle layer representing usually from 40% to 60% of the total volume of the stratified mixture. After removal of the supernatant clear oil, the sulfonate-containing layer is separated from the bottom calcium hydroxide layer as by decantation, dehydrated by heating, and filtered to give the concentrate constituting the product of the process.

In lieu of settling, as has been hereinbefore indicated, the lime-treated oil, preferably after removal of unreacted calcium hydroxide, but without prior heating to dehydration temperatures, may be subjected to centrifugation in order to concentrate the sulfonates. Centrifugation may also be advantageously employed in conjunction with gravity separation where highest concentration of the sulfonates is desired, i. e., a concentrate produced by settling may be centrifuged to further concentrate the sulfonates. Still further concentration of the sulfonates may be achieved by either gravity separation or centrifuging after dilution with a light oil such as a naptha fraction.

The amount of calcium hydroxide used in the neutralization of the acid oil according to the invention should be considerably in excess of the theoretical and is most preferably equal to from two to six times the amount actually required to effect the neutralization as calculated from the acid number of the oil.

On the other hand, we have found that the quantity of water required is a critical factor and must be confined within narrow limits. The water employed should be from about one half to two per cent of the weight of the acid-treated oil, and is most advantageously, equal to 1 to 1.5% of the weight of the acid-treated oil. Table I illustrates the effective range of water quantities upon the concentrate formed, where calcium hydroxide in amounts of 200 to 500% of the theoretical has been employed. The acid oil used had an acid number of 14.2, which is equivalent to about 11.2% sulfonic acid plus 88.8% oil and required addition of one to two per cent water for best results. An acid oil containing less sulfonic acid requires correspondingly less water for optimum results.

TABLE I

| Amount of Water Used, Per Cent | Per Cent Concentrate Formed | |
|---|---|---|
| | 200% Ca(OH)$_2$ | 500% Ca(OH)$_2$ |
| 0.75 | 99+ | 99+ |
| 1.0 | 57.3 | 63.0 |
| 1.25 | 52.7 | 53.4 |
| 1.50 | 47.8 | 51.3 |
| 1.75 | 50.6 | 61.1 |
| 2.0 | 63.8 | 63.0 |
| 2.25 | 99+ | 99+ |
| 2.50 | 0 | -------- |

Hence we have found that the character of the neutralization process is changed by controlling the water content, and that this effect can be capitalized by mechanically separating the clear oil layer and the sulfonate concentrate layer without heating or otherwise dehydrating. After separation the concentrate can be finished according to conventional practice.

In effecting the neutralization, the calcium hydroxide in the form of hydrated lime is advantageously added to the oil while agitating vigorously, mechanically or as by air-blowing. When the lime is completely dispersed, water is added and agitation is continued for a period of time to insure completion of the reaction, say ten to thirty minutes. A period of two to six hours settling is necessary for concentration on a practical scale, and the effectiveness of the concentration step is appreciably improved by settling for longer periods say fifteen to twenty-four hours. If a large excess of water is employed, i. e. over 2% by weight of the oil, a homogeneous liquid results which will not yield the desired concentrate even upon prolonged standing or centrifuging.

The use of a 5% aqueous solution of ammonium sulfate or a 20% aqueous solution of sodium sulfate in lieu of pure water in the neutralization has been found to facilitate the separating out of the sulfonates in many instances. This is illustrated in Table II from which it will be noted that 5% ammonium sulfate solution gave efficient settling in only 2 hours time.

TABLE II

Percent settled oil

| Settling Time Hours | 1 | 2 | 3 | 4 | 6 | 20 | 26 | 66 |
|---|---|---|---|---|---|---|---|---|
| Per Cent Salt Solution Used: | | | | | | | | |
| Pure Water | 5 | 10 | 11. | .18 | | | 47.5 | |
| 5% (NH$_4$)$_2$SO$_4$ | None | 80 | | 80 | | | | 80 |
| 20% Na$_2$SO$_4$ | 10 | 45 | 50 | 63 | 76 | 78 | 78 | |

Air-blowing of the acid oil prior to liming in order to free it of sulfur dioxide has been found to adversely influence the ease and rate of separation of the sulfonates from the limed acid oil in some cases. In other cases, air-blowing of the acid oils is without harmful effect, in fact appears to be beneficial. As yet we have been unable to account for this phenomenon.

We have determined that ½ hour's mixing of the calcium hydroxide, water, and acid oil usually suffices to produce sulfonates of quick settling characteristics. However, we have continued the stirring or mixing for as long as 3 hours with desirable results. In Table III below we show the effect of different mixing periods on the settling rate.

TABLE III

Percent settled clear oil

| Settling time (hours) | 1 | 2 | 3 | 4 | 5 | 6 | 17 |
|---|---|---|---|---|---|---|---|
| Time Hours Stirred: | | | | | | | |
| ½ | Trace | 5 | 10 | 20 | 20 | 25 | 70 |
| 1 | Trace | | 30 | 35 | 50 | | 70 |
| 2 | | 58 | 60 | 65 | | | 70 |
| 3 | 72 | 72 | | | | | 72 |

Our investigations indicate that warming of the acid oil to a maximum temperature of 110° F. prior to addition of the lime and water is advantageous from the standpoint of increasing the rate of the neutralization reaction. Preferably the lime is added first and is completely dispersed in the oil before the water is gradually added. Most of the heat generated by the reaction follows upon mixing in of the water.

With prior warming of the acid oil and addition of the lime and water in the order and manner stated, the total agitation period may be reduced to ten minutes or less in a small batch operation carried out with an amount of finely divided lime equivalent to 500% of that required to neutralize the oil and 20% of the lime weight of water or about one percent by weight on the oil.

The supernatant oil layer resulting from gravity separation of the sulfonates should not be discarded as it represents a valuable product. It may be used, for example, in a further sulfonation after drying with a light acid treatment, or it may be given a light earth treatment to remove sulfonates and moisture and then added to any lubricant improvable by the addition of a low viscosity well-refined neutral oil. The light oil fraction produced upon centrifuging of the limed acid oil may be similarly utilized.

We have previously referred herein to certain experiments which tend to substantiate our belief that mixed salts, hydrates, and/or basic calcium sulfonates are formed as a result of treatment of acid oil with calcium hydroxide. As is well-known, the acidity of an oil which has been treated with sulfuric acid is due not alone to the presence of sulfonic acids but also to the presence of inorganic acid compounds. With a divalent metal such as calcium, a mixed salt such as that hereinbefore illustrated could theoretically be formed. That such a salt is actually formed would seem to be shown by the fact that oil solutions of alkali metal sulfonates cannot be concentrated according to the invention.

That basic calcium sulfonates are formed as a consequence of the liming as carried out in the preferred manner with two to six times the amount of calcium hydroxide theoretically needed to effect the neutralization of the acid oil would seem to be proved by the results of several runs in which only 115% of the required amount of calcium hydroxide was used. Such an amount of calcium hydroxide could give only a negligible amount of basic sulfonates. In these runs, separation of a sulfonate layer upon standing of the limed mixture did not occur. We consider it highly important to use at least 150% of the theoretically required quantity of calcium hydroxide in the practice of our process.

Our invention is further illustrated by the following comparative examples:

Example I

The oil used in this experiment was a Mid-Continent crude base distillate of the following characteristics:

| | |
|---|---|
| Gravity | 24.4 |
| Flash | 395 |
| Fire | 455 |
| Vis. at— | |
| 100 | 220.4 |
| 130 | 106.8 |
| 210 | 44.7 |
| Pour | +10 |
| Color | 3½ |
| Percent S | 0.79 |

The oil was weighted into a 55 gallon drum having a welded cone bottom and a 2 inch fitting for sludge draw-off. It was heated with a steam coil while under agitation with air to a temperature of about 100° F., whereafter the equivalent of 30 pounds of fuming sulfuric acid per barrel of oil was added in from 30 to 45 seconds. Mixing was continued for approximately ½ hour. Sludge was allowed to settle for one to two hours and then drawn off as it settled. The sludge from this first acid dump was quite viscous. Each of a second, third, and fourth acid dump followed the same pattern as the first except that the settling period was progressively increased. Great care was exercised in order to assure thorough and complete sludge separation after the last dump of acid. The sludge-free oil was blown with air to effect the removal of sulfur dioxide following which it was pumped into a reactor kettle fitted with a stirrer for neutralization of sulfonic acids and other acid products with calcium hydroxide. The amount of calcium hydroxide employed was 200% as calculated from the acid number of the acid oil. Water was used in the neutralization to the extent of ½ the weight of the calcium hydroxide employed or about one percent by weight of the acid oil. The acid oil, water, and calcium hydroxide were stirred for thirty minutes at room temperature, at the end of which time the acid products were completely neutralized. Heat was then gradually applied to the reactor kettle in order to drive off water. About one hour was required for the dehydration. The temperature of the kettle contents at the end of the heating period was about 274° F. Considerable foaming accompanied the temperature change from 200° to 230° F. Following the dehydration, 2% filter aid was added and the mixture filtered through a 12 plate pressure filter press to give a clear finished oil of about .4% calcium content.

The described method of finishing the limed acid oil is representative of conventional practice. It will be referred to hereinafter in the examples as "normal finishing."

Example II

A sample of the limed acid oil was removed from the reactor kettle of Example I before heat was applied to the kettle. This sample was left standing overnight. The next morning the sample was found to have settled into a Ca(OH)$_2$ layer, a calcium sulfonate layer, and a supernatant layer of clear oil. The calcium sulfonate layer when decanted off, dehydrated and filtered in the same manner as the neutralized oil of Example I, was found to contain 1.38% calcium representing an increase over the filtrate of Example I of over 230%.

Laboratory analyses show that an 0.4% calcium content means that approximately 10% of the oil has been sulfonated. Hence by the just described method we increased sulfonate content to 33.2%.

The heating of the concentrate to effect its dehydration would convert any basic sulfonates, hydrates, or mixed salts present to neutral or true calcium sulfonates.

Example III

The oil used in this experiment was a Mid-Continent crude base distillate of the following characteristics:

| | |
|---|---|
| Gravity | 23.3 |
| Flash | 445 |
| Fire | 510 |
| Vis. at— | |
| 100 | 468.7 |
| 130 | 195.2 |
| 210 | 55.2 |
| Pour | +5 |
| Color | 4−(7++) |
| Per cent S | 0.53 |

The oil was treated with sulfuric acid in the same manner as the oil in Example I. 2092 parts by weight of the resulting acid oil which had an acid number of 17.6 was mixed with 52.9 parts of Ca(OH)$_2$ and 26.5 parts of water. The mixture was stirred for about ½ hour at 118° F. maximum temperature. A portion of the mixture was then subjected to normal finishing which yielded a clear oil containing 0.494% calcium.

Example IV

The remainder of the mixture of Example III was permitted to stand for a period of approximately 72 hours. This resulted in three-layer separation. The middle or sulfonate layer which accounted for 43.5% of the total weight of the stratified mixture when dehydrated and filtered gave a clear oil solution containing 1.21% calcium representing an increase over normal finishing of 245%.

*Example V*

250 pounds of an acid oil produced by treating a lube oil distillate having a viscosity of approximately 210 seconds at 100° F. with oleum were charged to a clean, cone bottomed 55-gallon agitator and warmed to 94° F. A very rapid stream of air was used for mixing. Finely divided hydrated lime in a quantity 500% of that required to neutralize the acid oil was then added over a period of one minute after which stirring was continued for four minutes to completely disperse the lime. Water equivalent to 20% of the lime weight was then added or about one percent by weight on the oil over a one-minute period and mixing continued for four minutes longer. The usual three-layer separation occurred upon standing of the mixture overnight. The sulfonate containing layer when dehydrated and filtered gave a concentrate containing about 20% calcium sulfonates. Dehydration and filtration of the supernatant oil layer yielded light colored oil analyzing approximately 1% sulfonates.

*Example VI*

A sample of a limed acid oil, which oil by normal finishing had yielded an oil containing .415% calcium, was filtered free of unreacted Ca(OH)$_2$ and subjected to centrifuging without prior heating. The resulting centrifugate, representing 78% of the volume of the charged oil had a calcium content of 0.034%. Hence, as a result of the centrifugation 92% of the calcium sulfonates in the limed acid oil was concentrated in 22% by volume of the oil.

By the term "gravitationally separating" as employed in the appended claims, we mean to embrace methods of separation, including settling and centrifugation, which are dependent on the difference between the specific gravities of the materials separated.

This application is a continuation-in-part of our co-pending application Serial No. 569,434, filed December 22, 1944, now abandoned.

We claim:

1. In a process for producing calcium sulfonates in petroleum oils, the improvement which comprises reacting a sulfuric acid-treated petroleum oil with calcium hydroxide in at least about 50 per cent excess of that required for complete neutralization in the presence of an amount of added water proportionate to the acid number of the acid-treated oil on the basis of 1 per cent to 2 per cent by weight of the acid-treated oil for an acid number of 14.2, and gravitationally separating a concentrate of the calcium sulfonates from the reaction mixture prior to dehydration and finishing of the concentrate.

2. In a process for producing calcium sulfonates in petroleum oils, the improvement which comprises reacting a sulfuric acid-treated petroleum oil with calcium hydroxide in at least about 50 per cent excess of that required for complete neutralization in the presence of an amount of added water proportionate to the acid number of the acid-treated oil on the basis of 1 per cent to 2 per cent by weight of the acid-treated oil for an acid number of 14.2, allowing the reaction mixture to settle and separate into a concentrate layer of oil and calcium sulfonates and a supernatant layer of oil substantially free of sulfonates, separating said concentrate layer from said supernatant oil, and thereupon heating the concentrate to a temperature sufficient to effect its dehydration and filtering the dehydrated concentrate to remove unreacted calcium hydroxide.

3. The process of claim 1 in which the separation of the concentrate is achieved by settling of the reaction mixture.

4. The process of claim 1 in which the separation of the concentrate is achieved by centrifugation.

5. The process of claim 2 in which the quantity of calcium hydroxide is equal to from two to six times the quantity required for complete neutralization of the acid-treated oil.

6. In a process for producing calcium sulfonates in petroleum oils, the improvement which comprises reacting a sulfuric acid-treated petroleum oil with calcium hydroxide in at least about 50% excess of that required for complete neutralization in the presence of an amount of water in the proportion approximating six to twelve molecules of water to one molecule of calcium sulfonate, and gravitationally separating a concentrate of the calcium sulfonates from the reaction mixture prior to dehydration and finishing of the concentrate.

HAROLD E. LATIER.
FRANKLIN M. WATKINS.

REFERENCES CITED

The following references are of record in the file of this patent:

UNITED STATES PATENTS

| Number | Name | Date |
| --- | --- | --- |
| 2,426,540 | Watkins et al. | Aug. 26, 1947 |